(12) United States Patent
Lay et al.

(10) Patent No.: US 7,298,511 B2
(45) Date of Patent: Nov. 20, 2007

(54) DOCUMENT PRINT HISTORY

(75) Inventors: Daniel Travis Lay, Meridian, ID (US); Travis J. Parry, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 950 days.

(21) Appl. No.: 10/198,824

(22) Filed: Jul. 18, 2002

(65) Prior Publication Data
US 2004/0021708 A1 Feb. 5, 2004

(51) Int. Cl.
*G06F 3/12* (2006.01)
*G06F 15/00* (2006.01)
(52) U.S. Cl. .................. 358/1.15; 358/1.13; 347/5
(58) Field of Classification Search .............. 358/1.15, 358/1.14, 1.13, 1.18, 1.1, 1.16, 1.17, 468, 358/407; 347/5, 2; 399/1
See application file for complete search history.

(56) References Cited

U.S. PATENT DOCUMENTS

| 6,411,970 B1 * | 6/2002 | Aitken et al. ............... 707/205 |
| 6,918,082 B1 * | 7/2005 | Gross et al. ................ 715/511 |
| 2002/0051166 A1 * | 5/2002 | Tomita ....................... 358/1.13 |

OTHER PUBLICATIONS

Michael Larson, Using Microsoft Word 2000 1999, Special ed., pp. 1-4.*

* cited by examiner

*Primary Examiner*—Dov Popovici

(57) ABSTRACT

The present disclosure relates to generating print history information regarding an electronic document and recording the information into a print history property within the electronic document. Print history information includes details of each print instance, such as the date and time a document is printed, the printer used, and the computer device providing the print job. Advantages of the disclosed system and methods for creating a document print history include an ability to determine particular users who print restricted-access documents and an ability to maintain document databases.

21 Claims, 4 Drawing Sheets

DOCUMENT PRINT HISTORY

TECHNICAL FIELD

The present disclosure relates to printing, and more particularly, to recording and updating various print history information into an electronic document as part of the electronic document's properties.

BACKGROUND

Various application programs generate information about electronic files/documents as the electronic files/documents are created within the application programs. Information is typically saved within an electronic document under various properties of the document. These properties are viewable by users through a document properties tab accessible through a pull-down menu within an application. Although the information can vary from application to application, it is typically related to the document's creation. The information might therefore be categorized in properties such as an origination property that includes the document's author, creation date, revision number, who last saved the document and the date they saved it. Another property might be a statistical property containing information such as the number of pages, paragraphs, lines, words, and characters the document contains.

Although such information may be useful to the author of a document, it does not help in understanding what happens to the document after the document has been completed. Information regarding how a document is used after it has been created may be useful for various purposes. For example, print history information including when, where, and by whom a document has been printed may be a useful tool to help track the use of the document. Such information may be of particular benefit for tracking secure documents that have restricted access. Such print history information might also be useful in maintaining document databases and for metrics reporting purposes. For example, documents that have little or no print history over a given time period may be deemed to be of no use and therefore removed from a database, while those with recently active print histories might be retained in the database as still being useful.

Accordingly, the need exists for a way to accumulate print history information for individual electronic documents, maintain associations between individual electronic documents and their corresponding accumulated print history information, and present accumulated print history information to users regarding individual electronic documents.

SUMMARY

During the printing process of an electronic document, a print driver is configured to record print history information about the printing process into the electronic document.

In a particular embodiment, a print driver receives an electronic document from an application program executing on a client computer. The driver formats the document into a printer-friendly format and sends the document to a printer to be rendered as hardcopy output. During this process, the driver records information into the electronic document regarding the print process. Print history information for each print instance of an electronic document is made available to a user through a print history option in the electronic document's properties.

BRIEF DESCRIPTION OF THE DRAWINGS

The same reference numbers are used throughout the drawings to reference like components and features.

DETAILED DESCRIPTION

The present disclosure relates to generating print history information regarding an electronic document and recording the information into a print history property within the electronic document. Print history information includes details of each print instance, such as the date and time a document is printed, the printer used, and the computer device providing the print job. Advantages of the disclosed system and methods for creating a document print history include an ability to determine particular users who print restricted-access documents and an ability to maintain document databases.

Exemplary System Environment for Creating a Document Print History

Figure 1:
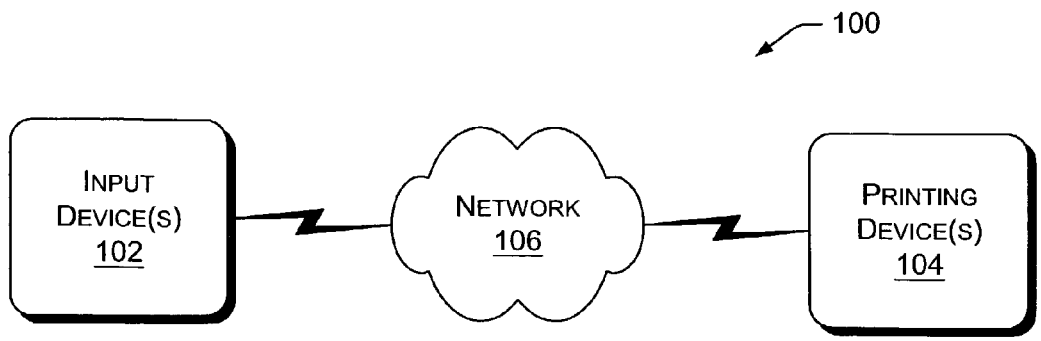
FIG. 1 illustrates a system environment suitable for creating a print history of an electronic document.

FIG. 1 illustrates an example of a system environment 100 suitable for creating a print history of an electronic document. The system 100 includes input device(s) 102, printing device(s) 104, and a communication network 106 operatively coupling input device(s) 102 to printing device(s) 104. The communication network 106 can include both local and remote connections depending on the particular system configuration. Thus, network connection 106 may include, for example, a printer cable, a LAN (local area network), a WAN (wide area network), an intranet, the Internet, and other such suitable communications links. Network connection 106 can also include wireless communications links such as IR (infrared) or RF (radio frequency) links.

Input device(s) 102 can be implemented as a variety of general purpose computing devices including, for example, a personal computer (PC), a laptop computer, a Macintosh, a workstation computer, and other devices configured to communicate with printing device(s) 104. An input device 102 typically provides a user with the ability to manipulate or otherwise prepare in electronic form, an image or document to be rendered as an image that is printed or otherwise formed onto a print medium by a printer 104 after transmission over network 106. In general, input device 102 outputs data to printer 104 in a suitable PDL (page description language) driver format, such as PCL or PostScript. In addition, input device 102 is configured to record print history information into electronic documents/files as discussed more fully below with respect to particular embodiments.

This disclosure is applicable to various types of printing devices 104 capable of rendering PDL data in printed form on a print medium, such as printing pixels on paper. Therefore, printing devices 104 can include devices such as laser-based printers, ink-based printers, dot matrix printers, dry medium printers, plotters and the like. In addition, printing devices 104 might also include various multi-function peripheral (MFP) devices that combine a printing function with other functions such as facsimile transmission, scanning, copying and the like. In general, a printer 104 receives input data as a print job in a suitable PDL format transmitted by input device 102 over network 106. Printer 104 is configured to render the print job as a hard copy image document formed on various print media, such as paper or transparencies.

Exemplary System Embodiment for Creating a Document Print History

Figure 2:
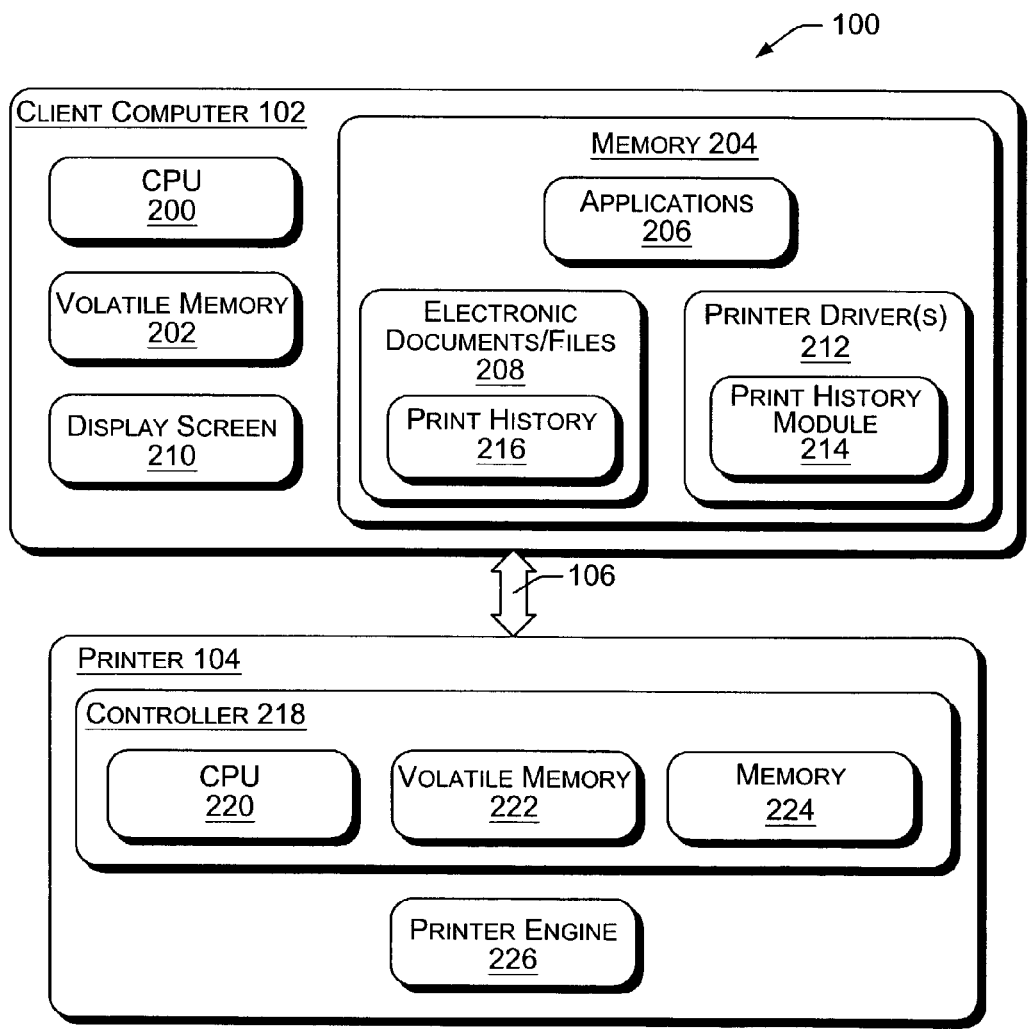
FIG. 2 is a block diagram illustrating in greater detail, an exemplary embodiment of an input device and a printing device that are suitable for implementation in the system environment shown in FIG. 1.

FIG. 2 is a block diagram illustrating in greater detail, an exemplary embodiment of an input device 102 and a printer 104 suitable for implementation in the system environment 100 of FIG. 1. Input device 102 is embodied as a client computer 102 operatively coupled to printer 104.

Client computer 102 typically includes a processor 200, a volatile memory 202 (i.e., RAM), and a nonvolatile memory 204 (e.g., ROM, hard disk, floppy disk, CD-ROM, etc.). Nonvolatile memory 204 generally provides storage of computer/processor-readable instructions, data structures, program modules and other data for client computer 102. Client computer 102 may implement various application programs 206 stored in memory 204 and executable on processor 200 to create or otherwise form an electronic document or image (e.g., text and/or graphics) such as electronic document 208 on a computer display screen 210. Such documents/images are transferable over network connection 106 to printer 104 for creating hard copies of the documents/images. Applications 206 typically include software programs implementing, for example, word processors, spread sheets, network browsers, multimedia players, illustrators, computer-aided design tools and the like.

Client computer 102 may also implement one or more software-based device drivers such as printer driver 212 that are stored in memory 204 and executable on processor 200. Device drivers might also be implemented on the specific devices they are "driving" such as printer 104. In general, printer driver 212 formats document information into a page description language (PDL) such as PostScript or Printer Control Language (PCL) or another appropriate format which is output to printer 104. In the current embodiment, printer driver 212 additionally includes a print history module 214 generally configured to generate print history information 216 and record it into electronic document files 208 as discussed more fully herein below.

Printer 104 of the FIG. 2 embodiment includes controller 212 that, in general, processes data from client computer 102 to control the output of printer 104 through printer device engine 226. The controller 212 typically includes a data processing unit or CPU 220, a volatile memory 222 (i.e., RAM), and a nonvolatile memory 224. Nonvolatile memory 224 can include various computer storage media such as ROM, flash memory, a hard disk, a removable floppy disk, a removable optical disk and the like. Nonvolatile memory 224 generally provides storage of computer/processor-readable instructions, data structures, program modules and the like for printer 104.

As mentioned above, client computer 102 implements printer driver 212, which includes print history module 214. Print history module 214 is configured to record print history information 216 into an electronic document 208 during a print process for the electronic document 208. Typically a print process is initiated from within an application program 206 by a user selecting a print command. The print command initiates a print process for an electronic document 208 that has been created or otherwise accessed by an application program 206. For example, a user working in a word-processing application such as Microsoft® Word®, may finish writing a document and select the print command from within the application, which initiates a print process through printer driver 212.

Figure 3:
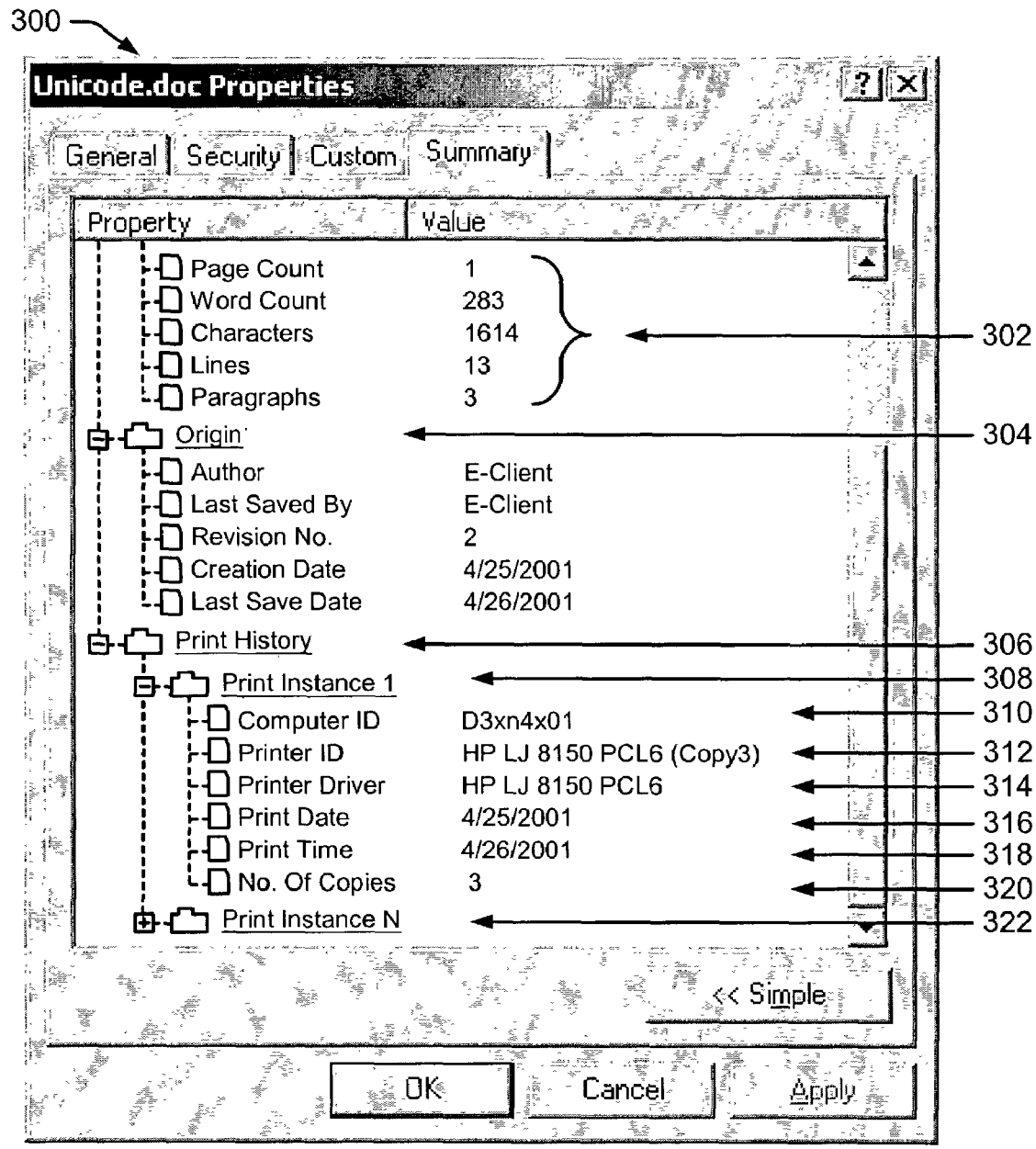
FIG. 3 is an example of a document properties dialog box illustrating a print history property.

Generally, during the creation of an electronic document 208 within an application program 206, information related to the creation of the electronic document 208 is generated by the application program 206 and stored in the electronic document 208 as a property of the electronic document 208. FIG. 3 illustrates an example of such document properties for a document entitled "Unicode.doc". The document properties are illustrated in a screen shot 300 on a display screen 210 of a computer such as client computer 102. The information provided in the document properties of FIG. 3 includes statistical information 302 such as the number of pages, words, characters, lines, and paragraphs in the document. An "origin" property 304 is also illustrated in FIG. 3 and contains information including the document's author, the last person or computer to save the document, the document's revision number, the document's creation date, and the document's last saved date.

Print history module 214 functions in a similar manner to gather or generate information related to the process of printing an electronic document 208, and to record or save that information as print history information 216 into the electronic document 208. Thus, the document properties of FIG. 3 include a print history 306 property tab. Within the print history 306 property tab are print instance tabs (e.g., 308, 322) that contain print history information related to the electronic document 208. Each time the electronic document 208 is printed, a print instance (e.g., 308, 322) is generated and stored in the electronic document 208. Each print instance contains print history information that corresponds with the particular print process implemented for that print instance. For example, in FIG. 3, print instance #1 308 contains print history information that indicates the print process was initiated on a computer 102, "D3×n4×01" 310, and that the printing was implemented on a printer 104, "HP LJ 8150 PCL6 (Copy 3)" 312. Print instance #1 308 also contains print history information that indicates the printer driver 212, 314 that was used, the date 316 and time 318 of the print process, and the number of copies 320 generated during the print process. It is noted that the print history information illustrated in FIG. 3 is only an example of the sort of information that might be recorded into an electronic document 208. Various other print history information might also be recorded into an electronic document 208.

Exemplary Methods for Creating a Document Print History

Example methods for creating a print history of an electronic document will now be described with primary reference to FIGS. 4, 5 and 6. The methods apply generally to the exemplary embodiments discussed above with respect to FIGS. 1, 2 and 3. The elements of the described methods may be performed by any appropriate means, such as by the execution of processor-readable instructions defined on processor-readable media, such as a disk, a ROM or other such memory device.

Figure 4:
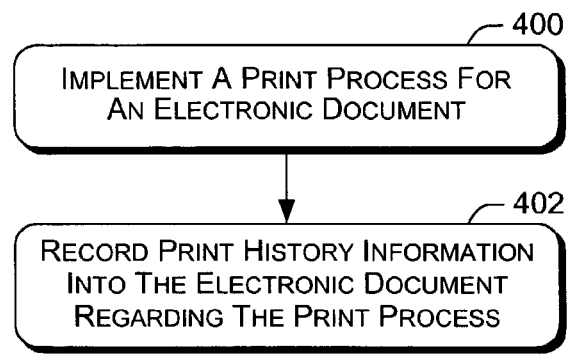
FIG. 4 is a flow diagram illustrating an example method of creating a print history of an electronic document.

Referring to the method illustrated in FIG. 4, at block 400, a print process is implemented for printing an electronic document. The print process typically begins when a user selects a print command from within an application program. The print process activates a print driver which processes the electronic document for printing. At block 402 of FIG. 4, print history information is recorded into the electronic document that relates to the print process. The information typically includes identification information for the computer 102 from which the print process is initiated, the printer 104 rendering the electronic document as hardcopy output, the print driver used to process the electronic document, the date and time of the print process, the number of copies made, and so on.

Figure 5:
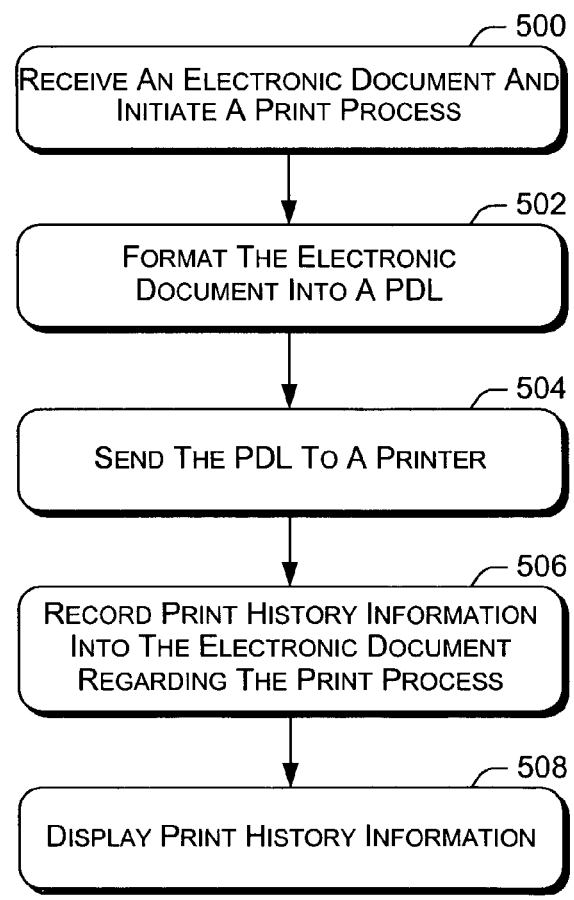
FIG. 5 is a flow diagram illustrating an alternate example method of creating a print history of an electronic document.

Referring now to the method illustrated in FIG. 5, at block 500, an electronic document is received and a print process is initiated. The electronic document is typically received from an application program executing on a client computer 102. The print process includes formatting the electronic document into a PDL (page description language) at block 502, and sending the PDL to a printer for rendering as hardcopy output at block 504. At block 506, print history information is recorded into the electronic document regarding the print process. Similar to the previous method, the print history information typically includes identification information for the computer 102 from which the print process is initiated, the printer 104 rendering the electronic document as hardcopy output, the print driver used to process the electronic document, the date and time of the print process, the number of copies made, and so on. At block 508, the print history information is displayed. The information is typically displayed on a computer display screen through the user interface of a print driver upon selection by a user of a document properties option.

Figure 6:
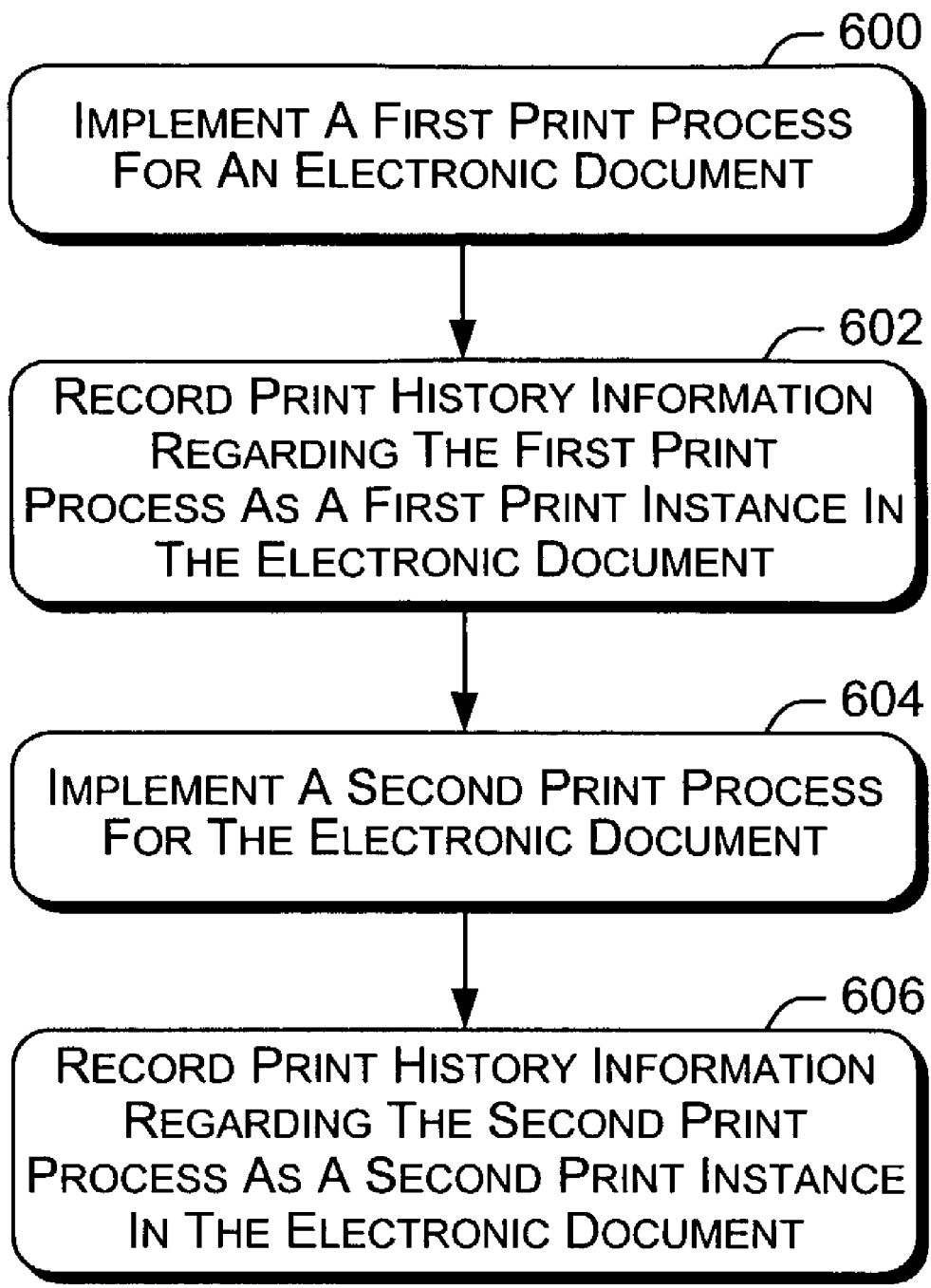
FIG. 6 is a flow diagram illustrating an alternate example method of creating a print history of an electronic document.

Referring now to the method illustrated in FIG. 6, at block 600, a first print process is implemented for printing an electronic document. The first print process typically begins when a user selects a print command from within an application program. The print process activates a print driver which processes the electronic document for printing. At block 602 of FIG. 6, print history information regarding the first print process is recorded into the electronic document. The print history information is generally recorded into a first print instance of a print history property on the electronic document. As in the previous methods, the information typically includes identification information for the computer 102 from which the first print process is initiated, the printer 104 rendering the electronic document as hardcopy output, the print driver used to process the electronic document, the date and time of the print process, the number of copies made, and so on.

At block 604 of FIG. 6, a second print process is implemented for printing the electronic document. The second print process may be initiated from the same computer 102 as the first print process, or it may be initiated from a different computer 102. Again, the second print process typically begins when a user selects a print command from within an application program. The second print process activates a print driver which processes the electronic document for printing. At block 606, print history information regarding the second print process is recorded into the electronic document. The print history information is generally recorded into a second print instance of the print history property on the electronic document. Thus, print history information from different print processes is distinguishable by different print instances stored on the electronic document. As in the previous methods, the print history information typically includes identification information for the computer 102 from which the first print process is initiated, the printer 104 rendering the electronic document as hardcopy output, the print driver used to process the electronic document, the date and time of the print process, the number of copies made, and so on. The various items of print history information may vary between each print instance. For example, the computer, printer, and printer driver may be different for each print instance. The date and time of each print instance will also be different.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

Additionally, while one or more methods have been disclosed by means of flow diagrams and text associated with the blocks of the flow diagrams, it is to be understood that the blocks do not necessarily have to be performed in the order in which they were presented, and that an alternative order may result in similar advantages.

The invention claimed is:

1. A computer-readable medium storing a computer-executable program comprising computer-executable instructions configured for:
   implementing a first print process for an electronic document; and
   recording print history information into the electronic document regarding the first print process,
   wherein the print history information comprises identification of a computer device from which the first print process was initiated, identification of a printer used for the first print process, a time of the first print process, and a date of the first print process.

2. A computer-readable medium as recited in claim 1, wherein the implementing further comprises:
   receiving the electronic document;
   formatting the electronic document into a PDL (page description language); and
   sending the PDL to a printer to be rendered as hardcopy output.

3. A computer-readable medium as recited in claim 1, wherein the recording print history information into the electronic document regarding the first print process further comprises recording print history information in a first print instance print history property of the electronic document.

4. A computer-readable medium as recited in claim 1, comprising further computer-executable instructions configured for:
   implementing a second print process for the electronic document; and
   recording print history information into the electronic document regarding the second print process.

5. A computer-readable medium as recited in claim 4, wherein the recording print history information into the electronic document regarding the second print process further comprises recording print history information in a second print instance print history property of the electronic document.

6. A computer-readable medium as recited in claim 1, comprising further computer-executable instructions configured for:
   displaying the print history information through a printer driver user interface.

7. A computer-readable medium as recited in claim 6, wherein the displaying further comprises displaying a user-selectable print history category within a document properties dialog box.

8. A computer-readable medium as recited in claim 1, wherein the print history information further comprises identification of a printer driver which processed the electronic document for the first print process, a number of copies made during the first print process, and a hardcopy output format of the first print process.

9. A computer-readable medium as recited in claim 2, wherein the PDL is in a format selected from the group of formats comprising:
PCL (printer control language); and
PostScript.

10. A computer-readable medium storing a computer-executable program comprising computer-executable instructions configured for:
implementing a first print process for an electronic document;
recording print history information into the electronic document as a first print instance regarding the first print process;
implementing a second print process for the electronic document; and
recording print history information into the electronic document as a second print instance regarding the second print process,
wherein the first print instance and the second print instance are different, and the print history information from the first print instance and the print history information from the second print instance are different.

11. A computer-readable medium as recited in claim 10, wherein the implementing further comprises:
formatting the electronic document into a PDL (page description language); and
sending the PDL to a printer to be rendered as hardcopy output.

12. A computer-readable medium as recited in claim 10, comprising further computer-executable instructions configured for:
displaying the print history Information through a printer driver user interface.

13. A computer-readable medium storing a computer-executable program comprising computer-executable instructions configured for:
receiving an electronic document from an application program executing on a computer device;
formatting the electronic document into a PDL (page description language);
sending the PDL to a printer to be rendered as hardcopy output;
recording print history information into the electronic document; and
displaying the print history information in a user interface of a printer driver on a display screen of the computer device,
wherein the print history information comprises a computer identification identifying the computer device, a printer identification identifying the printer, a printer driver identification identifying a printer driver used for the formatting a date associated with the sending, a time associated with the sending, and a number of copies of hardcopy output rendered.

14. A computer-readable medium as recited in claim 13, wherein the print history information further comprises a document format associated with the hardcopy output.

15. A method of recording document print history comprising:
implementing a print process for an electronic document; and
recording document print history information into the electronic document regarding the print process,
wherein the print history information comprises identification of a computer device from which the print process was initiated, identification of a printer used for the print process, a time of the print process, and a date of the print process.

16. A method of recording document print history comprising:
implementing a first print process for an electronic document;
recording print history information into the electronic document as a first print instance regarding the first print process;
implementing a second print process for the electronic document; and
recording print history information into the electronic document as a second print instance regarding the second print process,
wherein the first print instance and the second print instance are different, and the print history information from the first print instance and the print history information from the second print instance are different.

17. A method of recording document print history comprising:
receiving an electronic document from an application program executing on a computer device;
formatting the electronic document into a PDL (page description language);
sending the PDL to a printer to be rendered as hardcopy output;
recording print history information into the electronic document; and
displaying the print history information in a user interface of a printer driver on a display screen of to computer device,
wherein the print history information comprises a computer identification identifying the computer device, a printer identification identifying the printer, a printer driver identification identifying a printer driver used for the formatting, a date associated with the sending, a time associated with the sending, and a number of copies of hardcopy output rendered.

18. A computer comprising:
an electronic file;
a printer driver; and
a print history module associated with the printer driver, the print history module configured to record print history information into the electronic file as a different print instance each time a print process is implemented with respect to the electronic file,
wherein the electronic file includes more than one print instance for the electronic file, and each print instance contains the print history information corresponding with the particular print process implemented for the respective print instance.

19. A computer as recited in claim 18, further comprising a display screen, the print history module further configured to display on the display screen, a document properties dialog box that includes a user-selectable print history category for displaying the print history information upon selection by a user.

20. A computer comprising:
an electronic file that includes print history information;
a printer driver, and
a print history module associated with the printer driver, the print history module configured to update the print history information when a print process is implemented with respect to the electronic file, wherein the print history information comprises identification of a computer from which the print process was initiated, identification of a printer used for the print process, a time of the print process, and a date of the print process.

21. A system comprising:
an application program for generating an electronic document and initiating a print process for the electronic document; and a print driver for recording print history information into the electronic document regarding the print process,
wherein the print history information comprises identification of a computer from which the print process was initiated, identification of a printer used for the print process, a time of the print process, and a date of the print process.

* * * * *

UNITED STATES PATENT AND TRADEMARK OFFICE
CERTIFICATE OF CORRECTION

PATENT NO. : 7,298,511 B2 Page 1 of 1
APPLICATION NO. : 10/198824
DATED : November 20, 2007
INVENTOR(S) : Daniel Travis Lay et al.

It is certified that error appears in the above-identified patent and that said Letters Patent is hereby corrected as shown below:

In column 7, line 56, in Claim 13, after "formatting" insert -- , --.

In column 8, line 33, in Claim 17, delete "to" and insert -- the --, therefor.

In column 8, line 63, in Claim 20, delete "driver," and insert -- driver; --, therefor.

Signed and Sealed this

Thirteenth Day of May, 2008

JON W. DUDAS
*Director of the United States Patent and Trademark Office*